United States Patent

Yoshida

(10) Patent No.: US 7,905,262 B2
(45) Date of Patent: Mar. 15, 2011

(54) TIRE FOR MOTORCYCLE WITH TREAD HAVING CENTER REGION, MIDDLE REGIONS AND SHOULDER REGIONS

(75) Inventor: Shu Yoshida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 720 days.

(21) Appl. No.: 11/637,177

(22) Filed: Dec. 12, 2006

(65) Prior Publication Data

US 2007/0137747 A1    Jun. 21, 2007

(30) Foreign Application Priority Data

Dec. 20, 2005   (JP) ................... 2005-366463

(51) Int. Cl.
*B60C 1/00*   (2006.01)
*B60C 11/00*  (2006.01)

(52) U.S. Cl. ............... 152/209.5; 152/209.11

(58) Field of Classification Search .......... 152/209.5, 152/209.11
See application file for complete search history.

(56) References Cited

U.S. PATENT DOCUMENTS

| | | | | |
|---|---|---|---|---|
| 4,319,620 A | * | 3/1982 | Knill | 152/209.5 |
| 4,683,928 A | * | 8/1987 | Yahagi | 152/209.5 |
| 4,913,207 A | * | 4/1990 | Harakon et al. | 152/209.5 |
| 6,286,575 B1 | * | 9/2001 | Nakamura | 152/532 |
| 6,719,025 B2 | * | 4/2004 | Caretta et al. | 152/209.5 |
| 2003/0000616 A1 | * | 1/2003 | Watkins et al. | 152/209.5 |
| 2004/0040638 A1 | * | 3/2004 | Cole, III | 152/450 |
| 2005/0167019 A1 | * | 8/2005 | Puhala et al. | 152/209.5 |
| 2006/0102266 A1 | * | 5/2006 | Ravasio et al. | 152/209.5 |
| 2009/0173420 A1 | * | 7/2009 | Katayama et al. | 152/209.5 |

FOREIGN PATENT DOCUMENTS

| | | | |
|---|---|---|---|
| DE | 3525394 A1 | | 1/1986 |
| EP | 653317 | * | 5/1995 |
| EP | 1632364 | * | 3/2006 |
| JP | 01-127401 | * | 5/1989 |
| JP | 08-169208 | * | 7/1996 |

(Continued)

OTHER PUBLICATIONS

Machine translation for Japan 2000-158910 (no date).*
Machine translation for German 3525394 (no date).*
Abstract for Japan 01-127401 (no date).*
Machine translation for Japan 09-109615 (no date).*

(Continued)

*Primary Examiner* — Steven D Maki
(74) *Attorney, Agent, or Firm* — Birch, Stewart, Kolasch & Birch, LLP

(57) ABSTRACT

A tire (2) for a motorcycle includes a tread (4). The tread (4) has a center region (18), a pair of shoulder regions (20) and a pair of middle regions (22). In straight running, the center region (18) mainly comes in contact with a road surface. In cornering, the shoulder region (20) mainly comes in contact with a road surface. A modulus (Mm) of a rubber composition in the middle regions (22) is lower than a modulus (Mc) in the center region (18) and is higher than a modulus (Ms) in the shoulder regions (20). A ratio ((Mc−Mm)/(Mm−Ms)) is equal to or higher than 1/3 and is equal to or lower than 3/1. A ratio (Wm/W) is equal to or higher than 0.3 and is equal to or lower than 0.8. A ratio (Wc/W) is equal to or higher than 0.1 and is equal to or lower than 0.4. A ratio (Ws/W) is equal to or higher than 0.1 and is equal to or lower than 0.4.

5 Claims, 2 Drawing Sheets

FOREIGN PATENT DOCUMENTS

| | | | |
|---|---|---|---|
| JP | 8-169208 A | | 7/1996 |
| JP | 09-109615 | * | 4/1997 |
| JP | 2000-158910 A | | 6/2000 |
| JP | 2002-059709 | * | 2/2002 |
| WO | WO 2007/055322 A1 | | 5/2007 |

OTHER PUBLICATIONS

Machine translation for Japan 2002-059709 (no date).*

* cited by examiner

TIRE FOR MOTORCYCLE WITH TREAD HAVING CENTER REGION, MIDDLE REGIONS AND SHOULDER REGIONS

This application claims priority on patent application No. 2005-366463 filed in JAPAN on Dec. 20, 2005, the entire contents of which are hereby incorporated by reference.

BACKGROUND OF THE INVENTION

1. Field of the Invention

The present invention relates to a pneumatic tire to be attached to a motorcycle. In more detail, the present invention relates to an improvement in a tread of a tire.

2. Description of the Related Art

In cornering of a motorcycle, a centrifugal force acts on the motorcycle. For the cornering, it is necessary to apply a cornering force to be balanced with the centrifugal force. In the cornering, a rider inclines the motorcycle inward. By a camber thrust generated through the inclination, the cornering is achieved. In order to easily carry out the cornering, a tire for the motorcycle has a tread having a small radius of curvature. In straight running, a center region of the tread comes in contact with a road surface. On the other hand, in the cornering, a region provided on an outside of the center region comes in contact with the road surface.

In a race, the rider often inclines the motorcycle to the utmost limit, thereby carrying out sharp cornering. This state is referred to as a "full bank". In the sharp cornering, a shoulder region of the tread comes in contact with the road surface.

In the cornering, a grip force is required for the tire. In other words, a high coefficient of friction between the tire and a road surface is required. By employing a soft tread, it is possible to obtain a high coefficient of friction. However, a tire having the soft tread has a poor handling stability in the straight running. The grip force and the handling stability cannot be easily consistent with each other.

Japanese Laid-Open Patent Publication No. 8-169208 has disclosed a tire for a motorcycle in which a tread includes a center region and shoulder regions positioned on both sides of the center region. The center region is hard and the shoulder regions are soft. The hard center region contributes to a handling stability in straight running and the soft shoulder regions contribute to a gripping property in cornering.

In a race, the straight running and the cornering are repeated. A transition from the straight running to the cornering and a transition from the cornering to the straight running are generated very often. In the transition from the straight running to the cornering, a contact portion is moved from the center region to the shoulder region. On the other hand, in the transition from the cornering to the straight running, the contact portion is moved from the shoulder region to the center region. When the vicinity of a boundary between both of the regions comes in contact with the road surface during the transition (that is, a transition period), a characteristic to be transmitted from the road surface to the motorcycle is changed rapidly. The change causes a behavior of the motorcycle to be unstable.

It is an object of the present invention to provide a tire for a motorcycle which is excellent in a gripping property, a handling stability and a transition characteristic.

SUMMARY OF THE INVENTION

A tire for a motorcycle according to the present invention comprises a tread. The tread includes a center region, a pair of shoulder regions and a pair of middle regions positioned between the center region and the shoulder regions. The center region, the shoulder regions and the middle regions are formed by crosslinked rubber compositions. A modulus Mm of the rubber composition in the middle regions is lower than a modulus Mc of the rubber composition in the center region and is higher than a modulus Ms of the rubber composition in the shoulder regions. A difference (Mc−Mm) is equal to or greater than 0.4 MPa and is equal to or smaller than 1.1 MPa, and a difference (Mm−Ms) is equal to or greater than 0.4 MPa and is equal to or smaller than 1.1 MPa.

The tire for a motorcycle according to the present invention is excellent in a handling stability in straight running because the modulus Mc of the center region is high. The tire is excellent in a gripping property in cornering because the modulus Ms of the shoulder region is low. In the tire, the modulus Mm of the middle region is lower than the modulus Mc and is higher than the modulus Ms. In a transition from the straight running to the cornering and a transition from the cornering to the straight running, therefore, a rapid change in a characteristic is not generated. The tire is also excellent in a transition characteristic.

It is preferable that a ratio ((Mc−Mm)/(Mm−Ms)) of a difference (Mc−Mm) between the moduli Mc and Mm to a difference (Mm−Ms) between the moduli Mm and Ms should be equal to or higher than 1/3 and be equal to or lower than 3/1.

It is preferable that a ratio (Wm/W) of a circumference Wm of the middle region to a half circumference W of the tread should be equal to or higher than 0.2 and be equal to or lower than 0.8. It is preferable that a ratio (Wc/W) of a half circumference Wc of the center region to the half circumference W should be equal to or higher than 0.1 and be equal to or lower than 0.4, and a ratio (Ws/W) of a circumference Ws of the shoulder region to the half circumference W should be equal to or higher than 0.1 and be equal to or lower than 0.4.

It is preferable that a hardness of the center region should be equal to or higher than 35 and be equal to or lower than 45, a hardness of the shoulder region should be equal to or higher than 30 and be equal to or lower than 35, and a hardness of the middle region should be equal to or higher than 30 and be equal to or lower than 40 when the tread is held in an environment of 100° C.

DESCRIPTION OF THE PREFERRED EMBODIMENTS

The present invention will be described below in detail based on a preferred embodiment with reference to the drawings.

Figure 1:
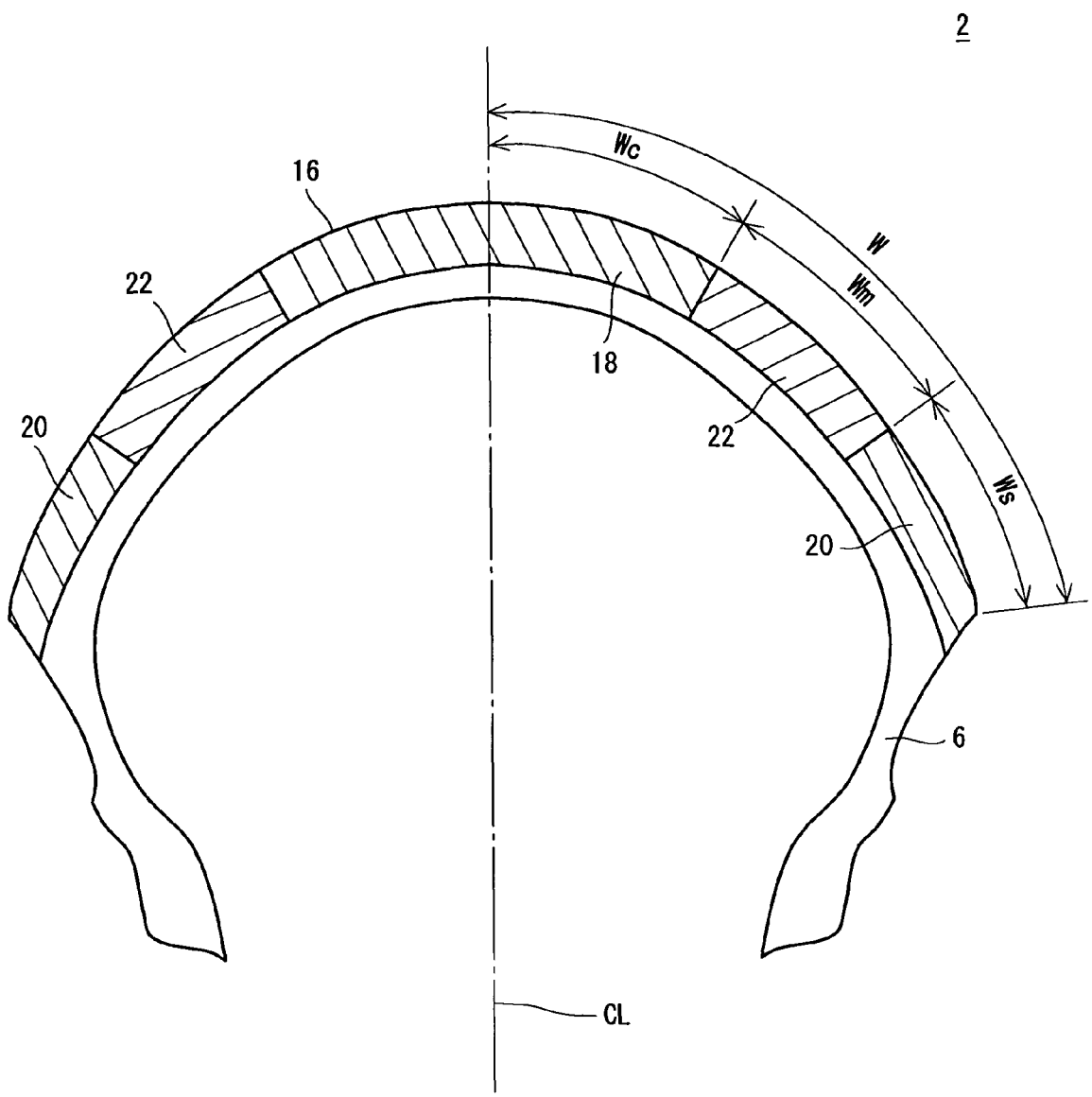
FIG. 1 is a typical view showing a tire for a motorcycle according to an embodiment of the present invention.
Figure 2:
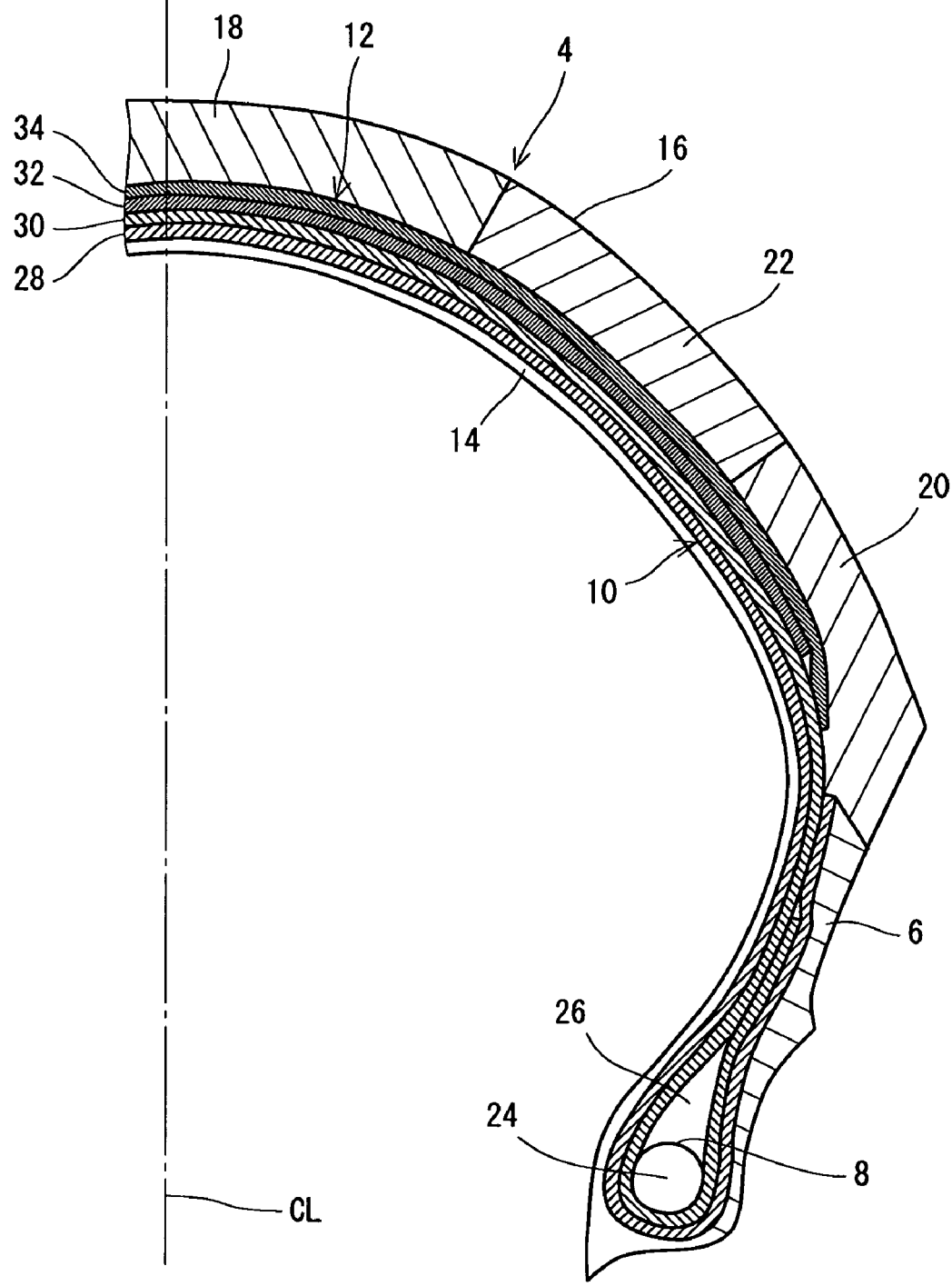
FIG. 2 is an enlarged sectional view showing a part of the tire in FIG. 1.

A tire 2 shown in FIGS. 1 and 2 takes an almost symmetrical shape about a one-dotted chain line CL. The one-dotted chain line CL represents an equator plane. In FIGS. 1 and 2, a vertical direction is set to be a radial direction and a transverse direction is set to be an axial direction. The tire 2 comprises a tread 4, a sidewall 6, a bead 8, a carcass 10, a belt 12, and an inner liner 14. The tire 2 is a pneumatic tire of a tubeless type. The tire 2 is mainly attached to a front wheel of the motorcycle.

The tread 4 takes a shape of an outward convex in the radial direction. The tread 4 forms a tread surface 16 to come in contact with a road surface. The tread 4 is constituted by a center region 18, a pair of shoulder regions 20 and a pair of middle regions 22. The center region 18 is provided across the equator plane CL. The shoulder region 20 is positioned on an outside in the axial direction. The middle region 22 is positioned between the center region 18 and the shoulder region 20.

The sidewall 6 is extended almost inward in the radial direction from an end of the tread 4. The sidewall 6 is formed by a crosslinked rubber composition. The sidewall 6 absorbs a shock from the road surface by a flexure. Furthermore, the sidewall 6 prevents an external damage of the carcass 10.

The bead 8 is extended almost inward in the radial direction from the sidewall 6. The bead 8 includes a core 24 and an apex 26 extended outward in the radial direction from the core 24. The core 24 is ring-shaped and includes a plurality of non-extensible wires (typically, wires formed of steel). The apex 26 is tapered outward in the radial direction. The apex 26 is formed by a crosslinked rubber composition. The apex 26 has a high hardness.

The carcass 10 includes a first carcass ply 28 and a second carcass ply 30. The first carcass ply 28 and the second carcass ply 30 are laid between the beads 8 on both sides along an inside of the tread 4 and the sidewall 6. The first carcass ply 28 and the second carcass ply 30 are wound around the core 24 from an inside to an outside in the axial direction.

The first carcass ply 28 and the second carcass ply 30 are constituted by a cord and a topping rubber, which is not shown. An absolute value of an angle formed by the cord with respect to the equator plane CL is usually 70 to 90 degrees. In other words, the tire 2 is a radial tire. The cord is usually constituted by an organic fiber. Examples of a preferable organic fiber include a polyester fiber, a nylon fiber, a rayon fiber, a polyethylene naphthalate fiber and an aramid fiber. The carcass may be constituted by a single ply. A carcass having a cross-ply structure may be employed.

The belt 12 is positioned on an outside in the radial direction of the carcass 10. The belt 12 is provided on the carcass 10. The belt 12 reinforces the carcass 10. The belt 12 includes an inner belt ply 32 and an outer belt ply 34. Each of the inner belt ply 32 and the outer belt ply 34 is formed by a cord and a topping rubber, which is not shown. The cord is inclined to the equator plane. Usually, an absolute value of an inclination angle is equal to or greater than 10 degrees and is equal to or smaller than 35 degrees. An angle of the cord of the inner belt ply 32 with respect to the equator plane is reverse to that of the cord of the outer belt ply 34 with respect to the equator plane. It is preferable that the cord should be constituted by steel or the aramid fiber. The belt may be constituted by a single ply. The tire may have a band on an outside of the belt 12.

The inner liner 14 is bonded to an inner peripheral surface of the carcass 10. The inner liner 14 is formed by a crosslinked rubber composition. A rubber having a small air transmittance is used for the inner liner 14. The inner liner 14 plays a part in holding an internal pressure of the tire 2.

The center region 18, the shoulder region 20 and the middle region 22 are constituted by crosslinked rubber compositions. A modulus Mc of the rubber composition in the center region 18 is high. A modulus Ms of the rubber composition in the shoulder region 20 is low. A modulus Mm of the rubber composition in the middle region 22 is lower than the modulus Mc and is higher than the modulus Ms. Differences (Mc−Mm) and (Mm−Ms) are smaller than a difference (Mc−Ms). In the present invention, the moduli Mc, Ms and Mm imply a tensile stress (MPa) in an elongation of 300%. The moduli Mc, Ms and Mm are measured in accordance with the regulations of "JIS K 6251". For the measurement, "Strograph—Type T" manufactured by TOYO SEIKI KOGYO CO., LTD. is used. A measuring temperature is 100° C. For the measurement, a specimen of JIS Dumbbell No. 5 is used.

In the tire 2, the center region 18 mainly comes in contact with a road surface in straight running and the shoulder region 20 mainly comes in contact with the road surface in cornering (particularly, a full bank). In a transition from the straight running to the cornering, a contact portion is first moved from the center region 18 to the middle region 22, and furthermore, is moved from the middle region 22 to the shoulder region 20. Since the difference (Mc−Mm) is small, the characteristic is not changed rapidly in the transition from the center region 18 to the middle region 22. Since the difference (Mm−Ms) is small, furthermore, the characteristic is not rapidly changed also in the transition from the middle region 22 to the shoulder region 20.

In the transition from the cornering to the straight running, the contact portion is first moved from the shoulder region 20 to the middle region 22, and furthermore, is moved from the middle region 22 to the center region 18. Since the difference (Mm−Ms) is small, the characteristic is not changed rapidly in the transition from the shoulder region 20 to the middle region 22. Since the difference (Mc−Mm) is small, furthermore, the characteristic is not rapidly changed also in the transition from the middle region 22 to the center region 18.

It is preferable that the difference (Mc−Ms) should be equal to or greater than 0.8 MPa. In the tire 2 in which the difference (Mc−Ms) is equal to or greater than 0.8 MPa, a handling stability in the straight running and a gripping property in the cornering can be consistent with each other. From this viewpoint, the difference (Mc−Ms) is more preferably equal to or greater than 1.2 MPa and is particularly preferably equal to or greater than 1.5 MPa. The difference (Mc−Ms) is preferably equal to or smaller than 2.5 MPa and is more preferably equal to or smaller than 2.0 MPa.

It is preferable that the difference (Mc−Mm) should be equal to or smaller than 1.5 MPa. In the tire 2 in which the difference (Mc−Mm) is equal to or smaller than 1.5 MPa, a characteristic is not changed rapidly in the transition from the center region 18 to the middle region 22 and the transition from the middle region 22 to the center region 18. From this viewpoint, the difference (Mc−Mm) is more preferably equal to or smaller than 1.2 MPa and is particularly preferably equal to or smaller than 1.0 MPa.

It is preferable that the difference (Mm−Ms) should be equal to or smaller than 1.5 MPa. In the tire 2 in which the difference (Mm−Ms) is equal to or smaller than 1.5 MPa, a characteristic is not changed rapidly in the transition from the shoulder region 20 to the middle region 22 and the transition from the middle region 22 to the shoulder region 20. From this viewpoint, the difference (Mm−Ms) is more preferably equal to or smaller than 1.2 MPa and is particularly preferably equal to or smaller than 1.0 MPa.

It is preferable that the difference (Mc−Mm) should be equal to or greater than 0.4 MPa. By setting the difference (Mc−Mm) to be equal to or greater than 0.4 MPa, it is possible to prevent the difference (Mm−Ms) from being excessively great. It is preferable that the difference (Mm−Ms) should be equal to or greater than 0.4 MPa. By setting the difference (Mm−Ms) to be equal to or greater than 0.4 MPa, it is possible to prevent the difference (Mc−Mm) from being excessively great.

It is preferable that a ratio ((Mc−Mm)/(Mm−Ms)) should be equal to or higher than 1/3 and be equal to or lower than 3/1. In the tire 2 in which the ratio is equal to or higher than 1/3, a characteristic is not rapidly changed in the transition from the shoulder region 20 to the middle region 22 and the transition from the middle region 22 to the shoulder region 20. From this viewpoint, the ratio is more preferably equal to or higher than 1/2 and is particularly preferably equal to or higher than 2/3. In the tire 2 in which the ratio is equal to or lower than 3/1, a characteristic is not changed rapidly in the transition from the center region 18 to the middle region 22 and the transition from the middle region 22 to the center region 18. From this viewpoint, the ratio is more preferably equal to or lower than 2/1 and is particularly preferably equal to or lower than 3/2.

In respect of the handling stability in the straight running, the modulus Mc of the center region 18 is preferably equal to or higher than 3.7 MPa, is more preferably equal to or higher than 4.0 MPa and is particularly preferably equal to or higher than 4.3 MPa. It is preferable that the modulus Mc should be equal to or lower than 5.7 MPa.

In respect of the gripping property in the cornering, the modulus Ms of the shoulder region 20 is preferably equal to or lower than 3.5 MPa and is more preferably equal to or lower than 3.2 MPa. It is preferable that the modulus Ms should be equal to or higher than 2.5 MPa.

In respect of a transition characteristic between the center region 18 and the middle region 22, the modulus Mm of the middle region 22 is preferably equal to or higher than 2.7 MPa, is more preferably equal to or higher than 3.0 MPa and is particularly preferably equal to or higher than 3.4 MPa. In respect of a transition characteristic between the shoulder region 20 and the middle region 22, the modulus Mm of the middle region 22 is preferably equal to or lower than 4.7 MPa, is more preferably equal to or lower than 4.4 MPa and is particularly preferably equal to or lower than 4.1 MPa.

In respect of the handling stability in the straight running, a hardness of the center region 18 is preferably equal to or higher than 35 and is more preferably equal to or higher than 38. It is preferable that the hardness of the center region 18 should be equal to or lower than 45. In respect of the gripping property in the cornering, a hardness of the shoulder region 20 is preferably equal to or lower than 35 and is more preferably equal to or lower than 32. It is preferable that the hardness of the shoulder region 20 should be equal to or higher than 30. In respect of a transition characteristic between the center region 18 and the middle region 22, a hardness of the middle region 22 is preferably equal to or higher than 30 and is more preferably equal to or higher than 34. In respect of a transition characteristic between the shoulder region 20 and the middle region 22, it is preferable that the hardness of the middle region 22 should be equal to or lower than 40. The hardness is measured by a Durometer of Type A in an environment of 100° C. Prior to the measurement, the tire 2 is held for two hours or more in the environment of 100° C.

In FIG. 1, a double arrow W indicates a half circumference of the tread 4. The half circumference W is a distance from an equator to an end of the tread which is measured along the tread surface 16. A double arrow Wc indicates a half circumference of the center region 18. The half circumference Wc is a distance from the equator to an end of the center region which is measured along the tread surface 16. A double arrow Ws indicates a circumference of the shoulder region 20. The circumference Ws is a distance from one of ends to the other end of the shoulder region 20 which is measured along the tread surface 16. A double arrow Wm indicates a circumference of the middle region 22. The circumference Wm is a distance from one of ends to the other end of the middle region 22 which is measured along the tread surface 16. The circumferences W, Wc, Ws and Wm are measured in a sample obtained by cutting the tire 2.

In respect of the handling stability in the straight running, a ratio (Wc/W) is preferably equal to or higher than 0.1 and is more preferably equal to or higher than 0.2. It is preferable that the ratio (Wc/W) should be equal to or lower than 0.4. In respect of the gripping property in the cornering, a ratio (Ws/W) is preferably equal to or higher than 0.1 and is more preferably equal to or higher than 0.2. It is preferable that the ratio (Ws/W) should be equal to or lower than 0.4. In respect of the transition characteristic, a ratio (Wm/W) is preferably equal to or higher than 0.2 and is more preferably equal to or higher than 0.3. The ratio (Wm/W) is preferably equal to or lower than 0.8 and is particularly preferably equal to or lower than 0.6.

EXAMPLES

Example 1

A tire for a motorcycle having the structure shown in FIGS. 1 and 2 was obtained. A tread of the tire is constituted by a center region, a pair of shoulder regions and a pair of middle regions. A modulus Mc of the center region is 4.5 MPa, a modulus Ms of the shoulder region is 3.0 MPa, and a modulus Mm of the middle region is 3.7 MPa. A ratio Wc/W is 0.2, a ratio Ws/W is 0.2 and a ratio Wm/W is 0.6. The tire has a size of "125/80R420".

Examples 2 to 7

Tires according to examples 2 to 7 were obtained in the same manner as in the example 1 except that the ratios Wc/W, Ws/W and Wm/W were set as shown in the following Table 1.

Examples 9 to 12 and Comparative Examples 1 and 2

Tires according to examples 9 to 12 and comparative examples 1 and 2 were obtained in the same manner as in the example 1 except that a rubber composition in the middle region was changed.

Examples 8 and 13

Tires according to examples 8 and 13 were obtained in the same manner as in the example 1 except that the rubber compositions in the center region, the shoulder region and the middle region were changed.

Sensuous Evaluation

The tire was incorporated into a rim and air was filled to have an internal pressure of 210 kPa. The tire and the rim ware attached to a motorcycle having a displacement of 1000 cm$^3$ a front wheel. A conventional tire was attached to the motorcycle as a rear wheel. The rear wheel has an internal pressure of 190 kPa. The motorcycle was caused to run in a racing circuit. A rider was caused to give a rating to a handling stability, a gripping property and a transition characteristic. The rating was set into five stages of "A" to "E". The result is shown in the following Tables 1 and 2.

TABLE 1

Result of Evaluation

|  |  | Example 2 | Example 3 | Example 1 | Example 4 | Example 5 | Example 6 | Example 7 |
|---|---|---|---|---|---|---|---|---|
| Modulus (MPa) | Center region Mc | 4.5 | 4.5 | 4.5 | 4.5 | 4.5 | 4.5 | 4.5 |
|  | Shoulder region Ms | 3.0 | 3.0 | 3.0 | 3.0 | 3.0 | 3.0 | 3.0 |
|  | Middle region Mm | 3.7 | 3.7 | 3.7 | 3.7 | 3.7 | 3.7 | 3.7 |
| Mc-Mm (MPa) |  | 0.8 | 0.8 | 0.8 | 0.8 | 0.8 | 0.8 | 0.8 |
| Mm-Ms (MPa) |  | 0.7 | 0.7 | 0.7 | 0.7 | 0.7 | 0.7 | 0.7 |
| (Mc-Mm)/(Mm-Ms) |  | 1.1 | 1.1 | 1.1 | 1.1 | 1.1 | 1.1 | 1.1 |
| Wc/W |  | 0.1 | 0.1 | 0.2 | 0.3 | 0.3 | 0.3 | 0.4 |
| Ms/W |  | 0.1 | 0.3 | 0.2 | 0.1 | 0.3 | 0.4 | 0.4 |
| Wm/W |  | 0.8 | 0.6 | 0.6 | 0.6 | 0.4 | 0.3 | 0.2 |
| Hardness (A) | Center region | 40 | 40 | 40 | 40 | 40 | 40 | 40 |
|  | Shoulder region | 30 | 30 | 30 | 30 | 30 | 30 | 30 |
|  | Middle region | 35 | 35 | 35 | 35 | 35 | 35 | 35 |
| Handling stability in straight running |  | B | B | A | A | A | A | A |
| Gripping property in cornering |  | B | A | A | B | A | A | A |
| Transition characteristic |  | A | A | A | A | B | B | C |

TABLE 2

Result of Evaluation

|  |  | Example 8 | Compa. Example 1 | Example 9 | Example 10 | Example 1 | Example 11 | Example 12 | Compa. Example 2 | Example 13 |
|---|---|---|---|---|---|---|---|---|---|---|
| Modulus (MPa) | Center region Mc | 4.2 | 4.5 | 4.5 | 4.5 | 4.5 | 4.5 | 4.5 | 4.5 | 5.0 |
|  | Shoulder region Ms | 3.3 | 3.0 | 3.0 | 3.0 | 3.0 | 3.0 | 3.0 | 3.0 | 2.5 |
|  | Middle region Mm | 3.7 | 3.0 | 3.2 | 3.4 | 3.7 | 4.1 | 4.3 | 4.5 | 3.7 |
| Mc-Mm (MPa) |  | 0.5 | 1.5 | 1.3 | 1.1 | 0.8 | 0.4 | 0.2 | 0 | 1.3 |
| Mm-Ms (MPa) |  | 0.4 | 0 | 0.2 | 0.4 | 0.7 | 1.1 | 1.3 | 1.5 | 1.2 |
| (Mc-Mm)/(Mm-Ms) |  | 1.3 | ∞ | 6.5 | 2.8 | 1.1 | 0.4 | 0.2 | 0 | 1.1 |
| Wc/W |  | 0.2 | 0.2 | 0.2 | 0.2 | 0.2 | 0.2 | 0.2 | 0.2 | 0.2 |
| Ms/W |  | 0.2 | 0.2 | 0.2 | 0.2 | 0.2 | 0.2 | 0.2 | 0.2 | 0.2 |
| Wm/W |  | 0.6 | 0.6 | 0.6 | 0.6 | 0.6 | 0.6 | 0.6 | 0.6 | 0.6 |
| Hardness (A) | Center region | 38 | 40 | 40 | 40 | 40 | 40 | 40 | 40 | 44 |
|  | Shoulder region | 33 | 30 | 30 | 30 | 30 | 30 | 30 | 30 | 26 |
|  | Middle region | 35 | 30 | 32 | 34 | 35 | 38 | 39 | 40 | 35 |
| Handling stability in straight running |  | B | A | A | A | A | A | A | A | A |
| Gripping property in cornering |  | B | A | A | A | A | A | A | A | A |
| Transition characteristic |  | A | D | C | B | A | B | C | E | C |

As shown in the Tables 1 and 2, the tire according to each of the examples is excellent in a handling stability, a gripping property and a transition characteristic. From the result of the evaluation, the advantages of the present invention are apparent.

The tire according to the present invention is also suitable for a rear wheel of a motorcycle. The tire is particularly suitable for a motorcycle for a race. The above description is only illustrative and various changes can be made without departing from the scope of the present invention.

What is claimed is:

1. A tire for a motorcycle comprising a tread,
wherein the tread includes a center region, a pair of shoulder regions and a pair of middle regions positioned between the center region and the shoulder regions,
the center region, the shoulder regions and the middle regions are formed by crosslinked rubber compositions, and
a modulus Mm of the rubber composition in the middle regions is lower than a modulus Mc of the rubber composition in the center region and is higher than a modulus Ms of the rubber composition in the shoulder regions;
wherein a difference (Mc−Mm) is equal to or greater than 0.4 MPa and is equal to or smaller than 1.1 MPa,
a difference (Mm−Ms) is equal to or greater than 0.4 MPa and is equal to or smaller than 1.1 MPa,
wherein the moduli Mc, Ms and Mm imply a tensile stress in an elongation of 300% at 100° C.,
wherein the modulus Mc is equal to or higher than 3.7 MPa and is equal to or lower than 5.7 MPa, the modulus Ms is equal to or higher than 2.5 MPa and is equal to or lower than 3.5 MPa, and the modulus Mm is equal to or higher than 2.7 MPa and is equal to or lower than 4.7 MPa, and
wherein a hardness of the center region is equal to or higher than 35 and is equal to or lower than 45, a hardness of the shoulder region is equal to or higher than 30 and is equal to or lower than 35, and a hardness of the middle region is equal to or higher than 30 and is equal to or lower than 40 when the tread is held in an environment of 100° C.

2. The tire according to claim 1, wherein a ratio ((Mc−Mm)/(Mm−Ms)) of a difference (Mc−Mm) between the moduli Mc and Mm to a difference (Mm−Ms) between the moduli Mm and Ms is equal to or higher than 1/3 and is equal to or lower than 3/1.

3. The tire according to claim 1, wherein a ratio (Wm/W) of a circumference Wm of the middle region to a half circumference W of the tread is equal to or higher than 0.2 and is equal to or lower than 0.8.

4. The tire according to claim 1, wherein a ratio (Wc/W) of a half circumference Wc of the center region to a half circumference W is equal to or higher than 0.1 and is equal to or lower than 0.4, and a ratio (Ws/W) of a circumference Ws of the shoulder region to the half circumference W is equal to or higher than 0.1 and is equal to or lower than 0.4.

5. The tire according to claim 1, wherein a hardness of the center region is equal to or higher than 38 and is equal to or lower than 45, a hardness of the shoulder region is equal to or higher than 30 and is equal to or lower than 32, and a hardness of the middle region is equal to or higher than 34 and is equal to or lower than 40 when the tread is held in an environment of 100° C.

* * * * *